United States Patent [19]

Balasundaram et al.

[11] Patent Number: 5,548,761
[45] Date of Patent: Aug. 20, 1996

[54] COMPILER FOR TARGET MACHINE INDEPENDENT OPTIMIZATION OF DATA MOVEMENT, OWNERSHIP TRANSFER AND DEVICE CONTROL

[75] Inventors: Vasanth Balasundaram, Peekskill; John L. Carter; Jeanne Ferrante, both of Briarcliff Manor, all of N.Y.

[73] Assignee: International Business Machines Corporation, Armonk, N.Y.

[21] Appl. No.: 28,493

[22] Filed: Mar. 9, 1993

[51] Int. Cl.$^6$ .................................................. G06F 9/45
[52] U.S. Cl. ............................................................. 395/700
[58] Field of Search ...................................... 395/700, 650

[56] References Cited

U.S. PATENT DOCUMENTS

| | | | |
|---|---|---|---|
| 4,642,764 | 2/1987 | Auslander et al. | 395/700 |
| 4,667,290 | 5/1987 | Goss et al. | 395/700 |
| 4,802,091 | 1/1989 | Cocke et al. | 395/700 |
| 4,885,684 | 12/1989 | Austin et al. | 395/700 |
| 4,953,084 | 8/1990 | Meloy et al. | 395/700 |
| 4,956,800 | 9/1990 | Kametani | 395/800 |
| 5,083,265 | 1/1992 | Valiant | 395/800 |
| 5,088,034 | 2/1992 | Ihara et al. | 395/700 |
| 5,093,916 | 3/1992 | Karp et al. | 395/700 |
| 5,146,594 | 9/1992 | Iitsuka | 395/700 |
| 5,313,614 | 5/1994 | Gorttelmann et al. | 395/700 |
| 5,339,419 | 8/1994 | Chan et al. | 395/700 |
| 5,355,492 | 10/1994 | Frankel et al. | 395/700 |
| 5,355,494 | 10/1994 | Sistare et al. | 395/700 |

OTHER PUBLICATIONS

Balasundaram, V. "Data Structures and Algorithms for Collective Communication Over A Dynamically ..." IBM TDB vol. 35 No. 3 Aug. 1992 pp. 465–470.
WO9215945-A1 Abstract.

*Primary Examiner*—Kevin A. Kriess
*Assistant Examiner*—John Q. Chavis
*Attorney, Agent, or Firm*—Louis J. Percello

[57] ABSTRACT

A method and apparatus designed to expose the power of manipulating data transfer and ownership to the compiler has been given. The key ideas behind the XDP methodology are its separation of data transfer from local computation, its non-blocking semantics to allow overlapping of communication with computation, and its unified treatment of data and ownership transfer. In addition, XDP offers the compiler a convenient platform for doing optimizations involving data movement by providing mechanisms for delayed communication binding and generating generalized compute rules. Compile-time data and data ownership transfers are accomplished independent of the target machine architecture. The run-time symbol table given here to support XDP is implementable as an extension to most high-level compiler intermediate languages. The applicability of XDP is quite general, and is not restricted to the optimization of communication for distributed memory machines. For instance, it can be used to optimize data transfers across different levels of a memory hierarchy.

10 Claims, 9 Drawing Sheets

FIG. 3

| | NOTATION |
|---|---|
| X | ANY EXCLUSIVE SECTION |
| E | EXCLUSIVE SECTION OWNED BY p. |
| U | EXCLUSIVE SECTION, ALL ELEMENTS UNOWNED BY p. |

| | INTRINSICS |
|---|---|
| mypid | RETURNS THE UNIQUE IDENTIFIER OF p. |
| mylb(X,d) | IF ANY ELEMENT OF X IS OWNED BY p, RETURNS THE SMALLEST INDEX IN DIMENSION d, MAXINT OTHERWISE. |
| myub(X,d) | IF ANY ELEMENT OF X IS OWNED BY p, RETURNS THE LARGEST INDEX IN DIMENSION d, MININT OTHERWISE. |
| iown(X) | RETURNS TRUE IF X IS OWNED BY p, FALSE OTHERWISE. |
| accessible(X) | RETURNS TRUE IF X IS OWNED BY p AND ITS DATA IS ACCESSIBLE, FALSE OTHERWISE. |
| await(X) | RETURNS FALSE IF X IS UNOWNED BY p, OTHERWISE BLOCKS UNTIL X IS ACCESSIBLE, THEN RETURNS TRUE. |

| | SEND STATEMENTS |
|---|---|
| E -> | INITIATE SEND OF THE NAME AND VALUE OF E. |
| E -> S | INITIATE SENDS OF THE NAME AND VALUE OF E TO PROCESSORS SPECIFIED BY SET S. |
| E => | BLOCKS UNTIL E IS ACCESSIBLE, THEN INITIATE SEND OF THE OWNERSHIP OF E. |
| E -=> | BLOCKS UNTIL E IS ACCESSIBLE, THEN INITIATE SEND OF OWNERSHIP AND VALUE OF E. |

| | RECEIVE STATEMENTS |
|---|---|
| E <- X | BLOCKS UNTIL E IS ACCESSIBLE, THEN INITIATE RECEIVE OF THE VALUE NAMED X INTO E. |
| U <= | INITIATE RECEIVE OF THE OWNERSHIP OF U. |
| U <=- | INITIATE RECEIVE OF OWNERSHIP AND VALUE OF U. |

| | STATES OF A SECTION |
|---|---|
| ACCESSIBLE | ENTIRE SECTION IS OWNED BY p AND p HAS NO UNCOMPLETED RECEIVES INVOLVING ANY ELEMENT OF THE SECTION. |
| TRANSISTIONAL | ENTIRE SECTION IS OWNED BY p AND AN UNCOMPLETED RECEIVE INVOLVING ANY ELEMENT OF THE SECTION HAS BEEN INITIATED BY p. |
| UNOWNED | SOME ELEMENT OF SECTION IS NOT OWNED BY p. IF A SECTION IS NOT UNOWNED, WE SAY IT IS OWNED. |

| SYMTAB INDEX | SYMBOL NAME | RANK | GLOBAL SHAPE | PARTITIONING 412 | SEGMENT SHAPE 414 | SEGMENTS 421 | SEGMENT DESCRIPTOR |
|---|---|---|---|---|---|---|---|
| 1 | A | 2 | (4,8) | (*,BLOCK) | (2,1) | | → PRT TO SEGDESC |
| 2 | B | 2 | (16,16) | (BLOCK,CYCLIC) | (4,2) | | → PRT TO SEGDESC |

410 encompasses SYMTAB INDEX through SEGMENT SHAPE; 420 encompasses SEGMENTS and SEGMENT DESCRIPTOR; 430 points to SEGMENT DESCRIPTOR column; 400 refers to the whole table.

"SEGDESC" IS AN ARRAY OF "#SEGMENTS" ITEMS, EACH OF WHICH TYPICALLY CONTAINS THE FOLLOWING FIELDS:

432    STATUS     - AN INTEGER SPECIFYING THE ACCESSIBILITY OF THE SEGMENT

434    LBOUND [RANK] - AN ARRAY OF "RANK" ITEMS, EACH SPECIFYING THE LOWER BOUND INDEX OF A DIMENSION.

436    UBOUND [RANK] - AN ARRAY OF "RANK" ITEMS, EACH SPECIFYING THE UPPER BOUND INDEX OF A DIMENSION.

438    STRIDE [RANK] - AN ARRAY OF "RANK" ITEMS, EACH SPECIFYING THE STRIDE ALONG A DIMENSION.

439    SEGPTR     - THE ADDRESS OF A SEGMENT OF LOCALLY OWNED DATA.

440    OTHER      - OTHER INFORMATION RELEVANT FOR TARGET MACHINE SPECIFIC OPTIMIZATIONS.

(a)
```
do i = 1, n
   A[i] = A[i] + B[i]
enddo
```

(b)
```
do i = 1, n
   iown(B[i] : { B[i] ->}
   iown(A[i] : {
           T[mypid] <- B[i]
           await(T[mypid])
           A[i] = A[i] + T[mypid]
         }
enddo
```

```
// A is distributed as (*,*,BLOCK)
// Loop1: 1-D FFT in the j direction
   do k = 1, 4
      iown(A[*,*,k]): {
         do i = 1, 4
            fft1D (A[i,*,k])
         enddo
      }
   enddo
// Loop2: 1-D FFT in the i direction
   do k = 1, 4
      iown(A[*,*,k]): {
         do j = 1, 4
            fft1D (A[*,j,k])
         enddo
      }
   enddo
// Loop3: Redistribute A as (*,BLOCK,*)
   do p = 1,4
      iown(A[*,*,p]): {
         do n = 1,4
            A[*,n,p] -=>
         enddo
         do n = 1,4
            A[*,p,n] <=-
         enddo
      }
   enddo
// Loop4: 1-D FFT in the k direction
   do j = 1, 4
      await(A[*,j,*]): {
         do i = 1, 4
            fft1D (A[i,j,*])
         enddo
      }
   enddo
```

```
// A is distributed as (*,*,BLOCK)
// Loop1: 1-D FFT in the j direction
   do i = 1, 4
      fft1D (A[i,*,mypid])
   enddo
// Loop2: 1-D FFT in the i direction
   do j = 1, 4
      fft1D (A[*,j,mypid])
   enddo
// Loop3a,3b: Redistribute A as (*,BLOCK,*)
   do n = 1,4
      A[*,n,mypid] -=>
   enddo
   do n = 1,4
      A[*,mypid,n] <=-
   enddo
 / Loop4: 1-D FFT in the k direction
   await(A[*,mypid,*]): {
      do i = 1, 4
         fft1D (A[i,mypid,*])
      enddo
   }
```

FIG. 8

```
// A is distributed as (*,*,BLOCK)
// 1-D FFT in the j direction
   do i = 1, 4
      fft1D (A[i,*,mypid])
   enddo
// 1-D FFT in the i direction
   do j = 1, 4
      fft1D (A[*,j,mypid])
      A[*,j,mypid] -=>
   enddo
// Loop3b
   do n = 1,4
      A[*,mypid,n] <=-
   enddo
// 1-D FFT in the k direction
   do i = 1, 4
      await(A[i,mypid,*]): {
         fft1D (A[i,mypid,*])
      }
   enddo
```

COMPILER FOR TARGET MACHINE INDEPENDENT OPTIMIZATION OF DATA MOVEMENT, OWNERSHIP TRANSFER AND DEVICE CONTROL

FIELD OF THE INVENTION

This invention relates to the field of computer compilers. More specifically, this invention relates to compilers that explicitly manipulate the movement, placement, and ownership of data to improve performance by using an intermediate form of a computer compiler.

BACKGROUND OF THE INVENTION

A compiler is a program that translates programs written in a source language to a those written in a target language. The source language is often a high level language such as Fortran. The target language is often assembly code or machine language, but may be a higher level language as well. A compiler usually performs optimizations to improve the performance of the target program for the given machine. An optimization is any transformation of the program with the aim of improving the performance of the target program.

To perform these tasks, often compilers comprise a front end, an intermediate language, an optimizer and a back end. The front end is designed to translate a specific high level language or languages (input program) into an intermediate representation of the program called the intermediate language (IL) or intermediate form. The intermediate language is distinct from the input or output program. The intermediate language is designed to be operated on by the specific optimizer of the compiler. The optimizer operates on the intermediate language by passing through the intermediate form a given number of times. During each pass through the intermediate form, the optimizer changes (translates) the intermediate form to an intermediate form which ultimately can be translated by the back end into a more efficient target language program for the target computer. Some compilers, i.e., the optimizers of the compilers, generate several levels of intermediate language. When the optimizer has completed its optimization of the final intermediate language, the back end of the compiler converts the final intermediate language into the target language of the compiler. Typically, this is machine executable object code that will be executed by the computer.

Optimizers include the methods to optimize the intermediate form into the most efficient target within the capability of the compiler. Accordingly, the optimizer is much harder to design and develop and has a great deal more complexity and code than either the front or back end of the compiler. As a result, compiler front ends are often redesigned for each high level language to produce an intermediate language (IL) that is compatible with a specific compiler optimizer to avoid redesigning the optimizer. Because the front end can be adapted relatively inexpensively to different high level languages, the compiler IL and optimizer are essentially high level (source language) independent.

Data movement refers to the transfer of values between devices. A device is a component, or logical group of components, of a computer. Devices are classified as either active or passive. Active devices are those for which the compiler has to explicitly generate code to be executed (e.g., processors, controllers, etc.). Passive devices are those for which no explicit code needs to be generated, because they have associated hardware to automatically service requests (e.g., cache, memory, etc.).

Although the prior art compilers insert instructions into the IL during optimization for the transfer of data between devices, these transfer instructions are only either implicit or explicitly target machine dependent. Examples of implicit transfers are usage of reads or writes to variables in the IL, and the target computer is a virtual shared-memory parallel computer: each read or write could result in data movement from one processor's local memory to another if the referenced variable was not available locally. Examples of machine dependent explicit transfers are the usage of matching send and receive operations during compiler optimization, and the target computer is a message-passing distributed-memory parallel computer: send and receive primitives are provided by the target computer as the only mechanism for specifying data movement between processors. The problem with implicit data transfers is that they are not explicitly represented in the IL and hence their optimization is not possible at compile-time, thus limiting the capability and flexibility of the compiler. On the other hand, the problem with machine dependent explicit data transfer operations in the IL is that the compiler optimizer design becomes very specific to the data movement mechanisms supported on a particular target computer. In summary, prior art optimizers either do not represent data movement and placement as an operation in the intermediate form (i.e. they are implicit) or they represent it explicitly in a machine-dependent way.

Prior art compilers also partition data, in particular, those that use the SPMD model. Partitioning refers to the distribution of data values among various devices. These initial data placements can either be specified in a high-level language, such as High Performance Fortran, or inserted by the optimizer. A device is said to own the data which is in a partition assigned to the device. For example, each processor device in a distributed memory machine or specific levels of memory in a memory hierarchy (such as a cache device and a memory device) will own the data values in the partition assigned to that respective device. Prior art compilers do allow for the possibility of implicitly transferring data between processors during the computation; this implies a corresponding change in what the processors own. However, in prior art compilers, the ownership transfer operation was not a separate operation from the data transfer operation in the IL, and consequently, could not be separately manipulated and optimized by the compiler.

STATEMENT OF PROBLEMS WITH THE PRIOR ART

The prior art compilers are unable to transfer data and/or ownership of data in a target machine independent manner. A machine independent transfer operation, either of ownership or data, is an operation, performed by a given compiler, that can be interpreted in many different device context (architectures), such as shared-memory parallel machines, distributed-memory parallel machines, uniprocessor machines, and between levels of the memory hierarchy.

The prior art compilers either do not have an operation in the IL for expressing data transfer operations, or transfer data in a machine dependent manner: that is, they use operations tied to a particular target machine. As a result, they cannot carry out optimizations which are independent of the target machine, and the optimizers may have to be rewritten for each type of new target machine. Prior optimizers can not separate information transfers into optimization of transfer operations in a general context, with a later more specific optimization in a machine dependent context. The prior art can not delay resolution of transfer operations to actual communication primitives.

The prior art compilers also transfer ownership in a machine dependent manner, by using machine dependent data transfer operations. In fact, the prior art optimizers have no operation for ownership transfer separate from data transfer. Hence, they cannot manipulate and optimize such operations separately. For example, if ownership transfer is represented as a separate operation, it is possible for the compiler to determine that only ownership of the data need be sent to a device, and not all the data values. Thus the compiler can generate code to perform this more efficient operation of just transferring ownership and not all the data values. The prior art fails to do this. As another example, prior art does not allow the expression of overlap of computation and transfer operations in the IL. Overlap of computation and transfer occurs if instructions representing computation can occur simultaneously with transfer operations.

In addition, the prior art assumes the "owner-computes" rule: only devices that have ownership of data are allowed to perform computations on that data. The prior art does not allow the compiler to control which devices should perform computations in a more general and flexible manner. The prior art also has no provision for devices that do not own data to run calculations on that data. Because of these failings, the prior art can only have data parallelism as expressed by the owner-computes rule. More general models of parallelism, such as control parallelism, which allocates different code to be executed on different devices, cannot be used, nor can any combination of data and control parallelism.

OBJECTS OF THE INVENTION

An object of this invention is an improved compiler apparatus that efficiently optimizes data and ownership transfer between devices.

An object of this invention is an improved optimizer and intermediate form of a compiler that can be used independent of target computer architectures and/or source language.

An additional object of this invention is an improved compiler that inserts data transfer operations in an intermediate language so that intermediate language data transfers can be optimized by the compiler optimizer independent of the target machine.

An additional object of this invention is an improved compiler that inserts ownership transfer operations in an intermediate language so that the intermediate language ownership transfers can be optimized by the compiler optimizer independent of the target machine.

A further object of this invention is an improved compiler that uses computer rules inserted in an intermediate language that allows the compiler to control run-time computations independent of which devices owns the data involved in the computation.

SUMMARY OF THE INVENTION

This invention is an improved compiler method and apparatus that provides data value transfer and data ownership transfer operations, called transfer operations, as part of the compiler intermediate language (IL) form in order to optimize these operations at compile time. These transfers are done in a manner independent of target machine architecture. The invention also provides compute rules to optimize and/or control the devices and/or device groups that run target code statements at run-time. The device optimization and/or control is done at compile-time, independent of the target machine, and can be used to control the manner and degree of parallel execution of the target code.

The compiler receives a high level language program at a front end section of the compiler. The compiler front end then generates an intermediate language (IL) form of the high level program. A compiler optimizer operates on the IL by passing through the statements of the IL one or more times. As the optimizer passes through the IL, it modifies and/or adds to the IL statements. In the initial passes, the optimizer inserts transfer operations, for data movement and/or data ownership transfer, and compute rules into the IL. The optimizer also puts information in the compile time symbol table of the IL and represents transfer operations and compute rules in the proper IL syntax. This new form of IL is called IL+XDP (eXplicit Data Placement).

The transfer operations are explicit statements that give notice of a given type of transfer to be performed involving data movement or ownership of data. However, target machine dependent aspects of the transfer, like the target device of the transfer need not be included in the transfer operation statements. Thus, this invention separates the transfer operations (of data movement or data ownership) into a target machine independent transfer operation and a target machine dependent resolution of the transfer operation. (Thus, unlike the prior art, the transfer operation and transfer resolution are separate. Therefore, the device involved in the transfer need be explicitly stated only when the transfer operation is resolved. The transfer operation is independent of the machine architecture and can be optimized independently of the machine architecture.)

Since the optimizer can explicitly insert target machine independent transfer operations into the IL, the optimizer can optimize the target machine independent transfer operations in later passes through the IL without having information about the target machine. Therefore, insertion of explicit, target machine independent transfer operations results in compile time optimization of data movement and ownership transfer in a machine independent manner. The target machine aspects of the data movement or ownership transfer are determined, or resolved, in later passes of the optimizer or in the compiler back end, and are machine-specific.

The optimizer, in its initial passes, also inserts compute rules into the IL. Compute rules are target machine independent Boolean expressions that can be resolved to a binary value that determines whether or not other statements, with which the compute rule is associated, will be executed or not. Since the compute rules are target machine independent, the optimizer can optimize the compute rules, independent of the target machine, during compile time. Optimizing compute rules includes changing the IL to eliminate certain compute rules and inserting code to replace compute rules. Compute rules are ultimately used to control the devices or groups of devices that execute the program statements that are associated with the compute rule. Therefore, compute rules can control the degree of parallel computation performed at run-time and are sometimes inserted into the IL to direct specific devices to perform specific tasks, e.g., load-balancing of work.

Upon completing all its intermediate passes through the IL, the optimizer has optimized all the required transfer operations and compute rules. The optimizer, in its final passes, resolves all the transfer operations and as many computer rules as appropriate or possible. This final form of IL is called the optimized IL+XDP. The optimized IL+XDP is passed to a compiler back end where the transfer operations, along with the rest of the IL+XDP code, are translated into target machine instructions and library calls. At this point, code is also generated to create a local copy of the run-time symbol table for each device from the compile-time symbol table. The run-time symbol table is also part of the target language code. The target language code is then loaded into the various appropriate devices of the target machine and run. A copy of the run-time symbol table is accessible to each active device on the target machine. The information in these tables, developed from the compute rules, determines whether or not a device runs a particular code statement, and therefore, can be used to control the degree of parallel executions that are run by the target machine devices.

BRIEF DESCRIPTION OF THE DRAWINGS

FIG. 3 shows the preferred XDP structures including send statements, receive statements, intrinsics, and states of a section.

FIG. 4 shows an example of the XDP symbol table used at compile-time and run-time.

FIG. 5 shows a simple example of an input program segment and its representation in a preferred IL+XDP intermediate form.

FIG. 6 shows the initial IL+XDP intermediate form representation of code for a 3D-FFT example.

FIG. 7 is the IL+XDP code representation of the 3D-FFT example after compute rule elimination.

FIG. 8 is the IL+XDP code representation of the 3D-FFT example after loop fusion.

DEFINITIONS

Element: An element is a unit of data. Each data variable consists of elements; a scalar has only a single element; an array consists of several elements.

Ownership: XDP assumes the distribution of elements of all variables among processors/devices in a multiprocessor (multidevice) environment. Every element of a variable is either exclusively owned by a single processor/device or universally owned by all processors/devices. Using the present invention, it is possible to transfer the ownership of exclusively owned elements between devices. If an element is universally owned, each device has a copy, and the values at each device can be different.

Section: A section of a variable is either a scalar variable or some subset of an array's elements. For our purposes, the form of possible sections is determined by the IL; for example, sections can be defined by Fortran 90 triplet notation. (Ref: American National Standard programming Language Fortran 90. ANSI X3.198-1992. American National Standards Institute, N.Y., N.Y., 1978) A section of a variable is exclusive if every element of the section is exclusively owned; a section is universal if every element is universally owned. It is possible for one section of an array to be universal and another section of the same array to be exclusive.

A section of a variable is owned by a processor if the processor exclusively or universally owns every element of the section. References to the value and the name of a section of a variable are distinguished. A value cannot be used unless it is owned by the processor, names in XDP statements can refer to any section of any variable.

X: Denotes any exclusive section.

E: Denotes a section owned by an active (processor) device p.

U: Denotes an exclusive section having all elements unowned by p.

DETAILED DESCRIPTION OF THE INVENTION

Figure 1:
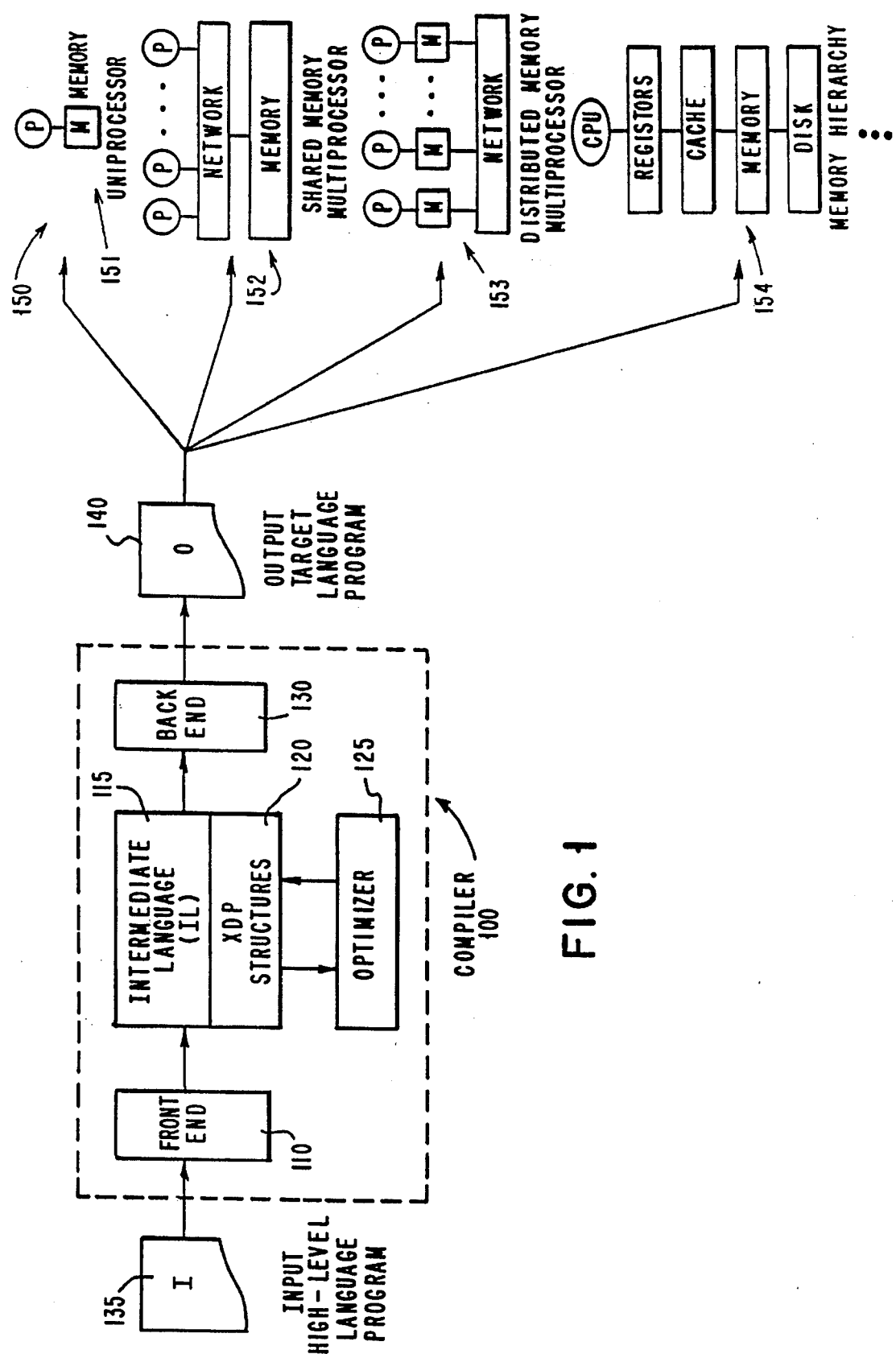
FIG. 1 is a block diagram of a computer system using the XDP compiler extensions, the present invention.

FIG. 1 shows a compiler that embodies the present invention. The compiler comprises a front end 110, and intermediate language (IL) form 115, Explicit Data Placement (XDP) structures 120, an optimizer 125, and a back end 130. The front end 110 receives high-level language programs 135, like FORTRAN, at its input and generates the IL 115. Front ends 110 are designed to covert a specific high-level language 135 into a specific IL 115 and are well known in the compiler arts. Any front end 110 that converts a high-level language into an intermediate language 115 is within the contemplation of this invention. The optimizer 125 inserts XDP structures 120 into the IL 115 as it makes one or more passes through the IL 115. XDP structures include transfer operations, intrinsics, and compute rules. After the optimizer 125 has completed its passes through the IL 115, the final version of the IL is passed to the back end 130. The back end 130 then generates and outputs a target language code 140 to be executed on a given target machine 150. Back ends are well known in the prior art and are designed specifically for a target machine 150. However, the back end 130 of this invention, performs additional XDP related functions including translating into the target language the final IL+XDP operations, and adding XDP information to the run-time symbol table. The present invention can be made to run on any general purpose computer hardware used to run compilers, for example, an IBM RS/6000 or Power Parallel cluster of RS/6000's.

The target machine 150 that runs the target language 140 generated by this invention can be structured in any number of architectures. These architectures include: a uniprocessor 151, a shared memory multiprocessor 152, a distributed memory multiprocessor 153, or a hierarchical structure of memory 154. These architectures are well known in the computer arts. The invention can also group devices (like a CPU, RAM, processor, etc.) that make up the target machines 150 in a given way at compile-time to determine which device or devices will execute a give code statement. This is described in more detail below. Given this disclosure, one skilled in the art could assemble other system architectures and/or device groupings. These are envisioned within the scope of this invention.

Figure 2:
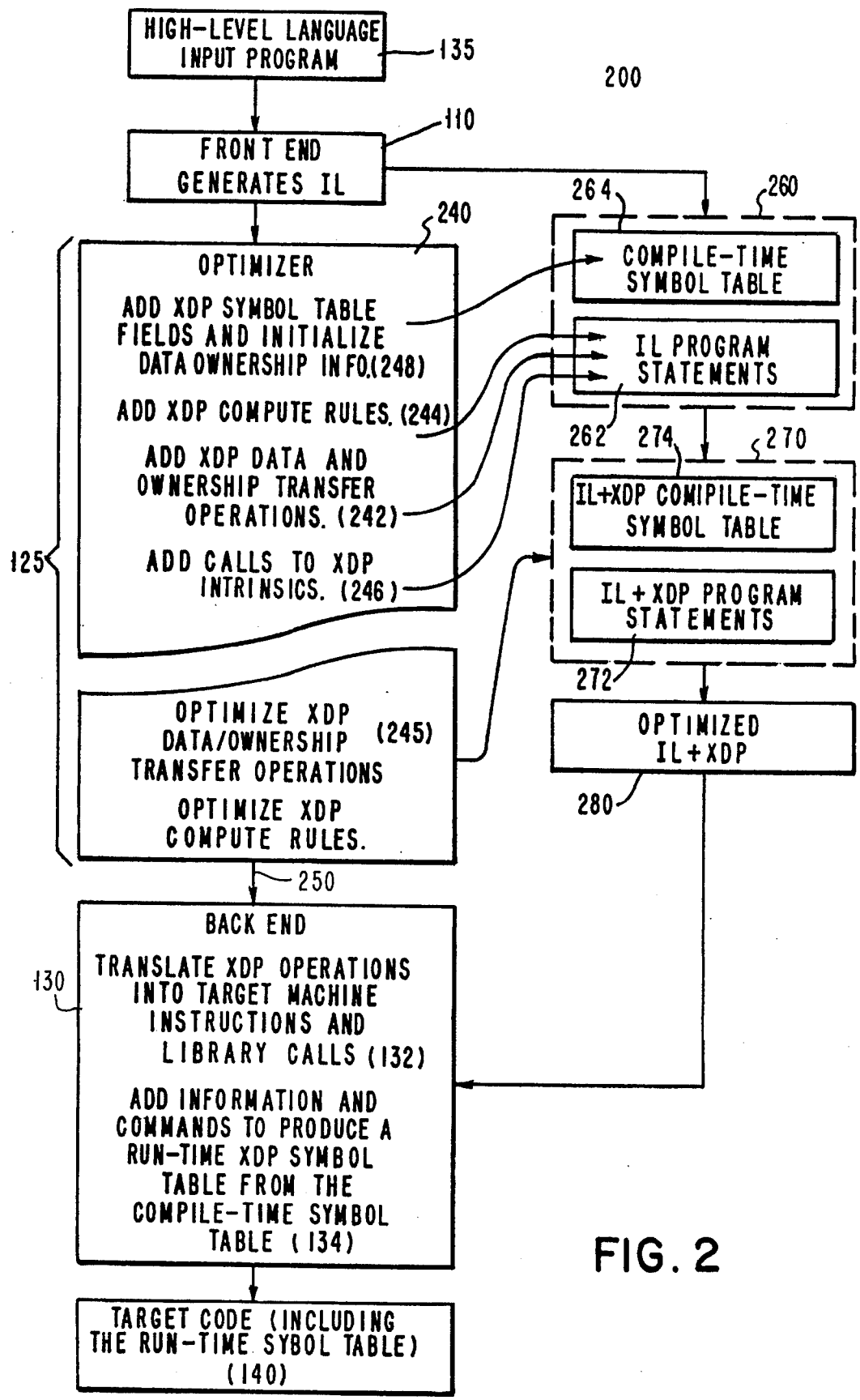
FIG. 2 is a block diagram showing how an XDP compiler optimizer cooperates with an XDP intermediate language to optimized target code.

FIG. 2 is a block diagram showing in more detail the steps that each of the elements of the invention perform in order to cooperate together at compile-time, independent of target machine architecture, to optimize data and ownership transfer and to determine target machine device execution of program statements. Block 135, block 110, block 130, and block 140 represent the high-level language program 135, the compiler front end 110, the compiler back end 130, the target language 140, respectively as described in FIG. 1. The optimizer 125, is divided into two parts, the part 240 that does the initial passes through the IL 260 and the part 245 that does later passes through the "modified" IL called the IL+XDP 270. The part of the optimizer 125 that does the initial passes 240 includes all the optimizer passes that insert XDP structures (120 in FIG. 1) into the IL 260. The remaining part 245 of the optimizer 125 includes the remaining optimizer 125 passes. The initial passes 240 of the optimizer 125 insert XDP structures like data value transfer operations 242, data ownership transfer operations 242, XDP compute rules 244, and calls to XDP "intrinsics" 246 as program statements 262 in the IL 260. Further, data ownership information is initialized and information is placed in XDP fields in the IL 260 compile-time symbol table 264. After the optimizer's 125 initial passes 240 have inserted the XDP structures 120 as IL 260 program statements 262 and updated the XDP information in the IL 260 compile-time symbol table 264, the IL 260 has been modified into a form called the IL+XDP 270. The IL+XDP 270 includes the XDP program statements 272 and the IL+XDP compile-time symbol table 274. The later passes 245 of the optimizer 125 operate on the IL+XDP intermediate language form 270 to optimize the data movement and data ownership transfer operations 242 and the compute rules 244. (Note that the invention also contemplates optimization in the initial passes 240 of the optimizer 125.) After the optimizer 125 has completed 250 all of its passes through the intermediate form, the result is an optimized IL+XDP intermediate form 280. This form is passed to the back end 130 where the remaining XDP transfer operations 132 and required XDP library calls 132 are translated into target machine object code 140. Fields in the compile time symbol table 274 are also updated with XDP information to create a run-time symbol table 134. This table 134 including the XDP information is also translated into target code 140.

FIG. 3 presents the preferred XDP structures: transfer operations and intrinsics. The intrinsics can be used to make up other XDP structures called compute rules. The state of a section is used to evaluate intrinsics.

States of a Section

In XDP an exclusive section can be in one of three states with respect to a given processor (or device), p, they are: 1. unowned by p; 2. accessible, meaning owned by p, and p has not initiated a receive that hasn't completed for that section; and 3. transitional, meaning owned by p and p has initiated an uncompleted receive for that section.

During execution, any section is in one of these three states. The state of any exclusive section is encoded in the status field of the run time per processor symbol table shown in FIG. 4.

The value of a transitional section is unpredictable, and yet XDP does not automatically check the state of a variable at run-time (except by use of the accessible( ) and await( ) predicates described later). This allows optimizations to remove run-time checks when it can be determined they are unnecessary.

Statements

Statements, see FIG. 2, block 262, are instructions that are put in the IL by the front end 110 and are inserted into the IL 260 and IL+XDP 270 by the optimizer 125. Although IL statements are known in the prior art, the present invention develops and uses several novel statement types that permit IL optimization in a target machine independent way. These novel statement types include transfer statements, compute rule statements, and intrinsic calls. Transfer statements are used to transfer (move) data or data ownership during the compile-time optimization of the IL in a target machine independent way. A transfer statement is divided into two phases: a transfer operation and a transfer resolution (or resolution). The transfer operation is a statement defined in a way to be target machine independent. Therefore, transfer operation statements can be optimized at compile-time independent of the target machine architecture. (The transfer resolution is target machine dependent and is performed by the later passes of the optimizer 245 or by the back end 130). Compute rule statements are associated with other statements that they guard. (See below.) Compute rule statements are used to control execution of statements at run-time. Intrinics are functions that can be used to make up compute rule statements. Intrinsic call statements are used to call an intrinsic function from a library of intrinsic functions when the back end 130 generates target code for compute rule statements using the called intrinsic.

Send and Receive Transfer Statements (Transfer Operation part)

Transfer operations, used to move data and to transfer ownership of data, comprise two types of statements that are inserted into the IL 260 by the optimizer 125: the send statement and the receive statement. Since these operations are distinct from the other operations in IL+XDP 270, they can be separately optimized by the optimizer 125. The send or receive statements have an initiation and a subsequent completion of the statements when executed.

FIG. 3 shows the various preferred transfer operations statements used as send statements. The statement E-> denotes the initiation of a data transfer operation in which the executing device sends the name and the value of E it exclusively owns to another unspecified device. The name is used as a tag to associate a send with a corresponding receive. It will be unnecessary to actually send the name if either the association between sender and receiver can be made at compile time, or if the hardware can make the association as on a shared address space machine. The restriction of data sends to exclusively owned sections of variables can always be overcome by copying the value of a universally owned section to an exclusive section. The "exclusively owned" restriction is only imposed here to simplify the semantics of our data transfer operations.

The transfer operation statement of the form E->S, where S is some set of processor id's, is also allowed. This statement denotes the initiation of a set of data transfer operations in which the executing device sends the value and name of E it exclusively owns to the specified locations. This statement can be used with S containing only one device as a way for the compiler to annotate which device will be the recipient of the section. It can also be used for a broadcast or multi-cast operation.

Another novel feature of XDP is its treatment of data ownership. Ownership in XDP is a transferable object, just as a data value can be transferred from one processor to another through communication. The statement E-=> denotes the initiation of an ownership send in which the executing device relinquishes the exclusive ownership of E as well as its value to an unspecified device. The statement E=> indicates the transfer of only the ownership of E, and not the value. The compiler may under some circumstances be able to determine that only the ownership, and not the value, needs to be transferred, and use the latter operation. The owner sends an operation block, that is it suspends execution, until the section is accessible.

There are various uses that can be made of XDP's ability to transfer ownership. First, when ownership of a section is transferred out of a processor, the storage it had occupied can be reused for a newly acquired section. This conserves address space and reduces paging. Second, it provides a wealth of possibilities for redistributing computation among the processors. Normally, one implements load balancing by migrating processes between processors. However, in XDP, load balancing can be implemented by migrating ownership of data while still running the same SPMD program on each processor. Since ownership dictates which SPMD program statements are executed by each processor, the ability to transfer data ownership allows the computation done on each processor to be altered dynamically without migrating any code. Thirdly, it opens up the possibility of new uses. For instance, a debugger could allow the user to input an ownership transfer command that moves exclusive ownership of a variable (and hence the permission to execute certain SPMD code segments, such as a print command that outputs the value of local data structures to the user's screen) from one processor to another. Thus, processors can be selectively monitored by simply transferring ownership of this variable.

For the below discussion of receive transfer operation statements, X always denotes an exclusive section (but not necessarily one owned by the executing processor p), E always denotes a section exclusively owned by p, and U denotes an exclusive section, no element of which is owned by p.

The statement E<-X denotes the initiation of a data receive operation, in which the executing device assigns to the variable E the received value of X. If the section is transitional, the statement blocks (i.e., the device suspends execution) until it becomes accessible. U<=- denotes the initiation of an ownership and value receive from an unspecified device, in which the executing device accepts the exclusive ownership and value of U. The statement U<= indicates the initiation of only the transfer of ownership of U, and not the value of U. Ownership of a section can only be received if the section was unowned.

It is incorrect usage of XDP if the sections transferred in send and receive operations do not match. The results of such a communication are unpredictable. XDP restricts the left hand side of a receive statement to an exclusive section so that the run-time symbol table need not contain entries for universally owned variables. This restriction can be overcome by the compiler if desired by allowing universally owned variables in the symbol table.

Several processors may initiate receive statements for the same section concurrently. For simplicity, a particular compiler may choose not to use this construct. However, it can be used to advantage, for instance to facilitate load balancing. This could be accomplished by having the owner of a particular variable initiate a sequence of sends of values of the variable, each value representing a certain job to be performed. Meanwhile, any processor that was otherwise idle could initiate a receive of that variable, and then perform the indicated job. Depending on the load at run-time, there might be multiple outstanding sends or outstanding receives not yet completed.

States of a Section

Only exclusive sections need have a state. These states are accessible, transitional, and unowned, and have already been described. We describe here how transfer operations cause these states to change. These changes are recorded in the status field of the device's run-time symbol table, described later.

Initially, all exclusive sections are in state unowned if they are not owned by the device. Upon initiation of a receive of a section on a device, the section must be put in state transitional. Upon completion of the receive, the section is returned to state accessible. Upon completion of an ownership send or receive, the state of the section must be updated to be unowned or accessible.

Compute Rules

Statements are executed only if the compute rule guarding them evaluates to trim. In the absence of a compute rule, statements are executed by each device that reaches the statement. A compute rule is any expression, including uses of intrinsics (which are described below), that evaluates to true or false. General boolean expressions available to the compiler can be used to generate compute rules. However, compute rules may not have side effects, so in particular they may not include send or receive statements. Compute rules are used to govern execution of IL+XDP statements.

In a compute rule, any reference to a section (other than as the first argument of an intrinsic) which is not owned by the processor/device executing the compute rule causes the entire compute rule to evaluate to false. Thus, a compute rule can always be executed on any processor/device without error.

Compute rules are syntactically distinct from the other IL+XDP statements so they can be treated separately, allowing the compiler to optimize them more easily. A typical optimization is compute rule elimination—the removal of a compute rule that always evaluates to true. Compute rule elimination can often be performed after the loop bounds are adjusted so that the computation within the loop only references owned sections.

XDP does not check whether a section used by a statement is transitional. Thus, the compiler must guard statements with appropriate synchronizing compute rules to ensure the program's correctness. This choice has been made to allow the compiler to remove run-time checks when it determines they are unnecessary.

Intrinsics

Compute rules can be created by using intrinsics. The first argument of an intrinsic is a name of an exclusive section, but it need not be owned by the executing device. Thus, intrinsics can be evaluated on any device.

XDP assumes each device has a unique device id denoted by the intrinsic mypid.

The intrinsic routine mylb(X,d) returns the smallest index in the dth dimension of any element of the exclusive section X owned by the invoking device. If no element is owned, MAXINT, the largest representable integer, is returned. A similar intrinsic routine myub(X,d) can be used to get the upper bound. These are evaluated at run time by checking the lbound, rbound and stride fields in the run time symbol table.

The iown( ) intrinsic predicate returns true if the device executing it is the owner of all elements of the section named (within the parenthesis). This is evaluated at run time on a device by returning true if the section named is not in state unowned as recorded in the status field of the device's symbol table.

The accessible( ) predicate intrinsic returns true if the section is accessible on the calling device. It can be used to allow a processor to perform a background computation while awaiting data from another processor. This is evaluated at run time on a device by returning true if the section named is in state accessible as recorded in the status field of the device's symbol table.

The await( ) intrinsic returns false if the section (named within the parenthesis) is unowned, otherwise it blocks until the section becomes accessible, at which time it returns true. Thus, await is a synchronization primitive. await is evaluated by checking the device's symbol table for the section. If the section is in state transitional, the device blocks, i.e., suspends execution, until it is changed to be not in state unowned. If the section is in state unowned, the evaluation returns false.

All of the intrinsics can be implemented as a lookup into the device's local run-time symbol table. While XDP language constructs are designed to be used by a compiler, it is entirely possible that the compiler will not be able to remove all ownership or accessibility tests, and so iown(), await( ) and accessible( ) predicates may need to be evaluated at run-time. In addition, ownership transfers result in run-time changes in ownership and so may need to be tracked at run-time. To support this, the XDP methodology supplies both a compile-time symbol table and a per-processor run-time symbol table for exclusive sections.

Optimization and Code Generation

Compiler optimizations that affect data movement and storage issues can be represented as transformations to the IL+XDP code 270. These transformations are performed by the later optimizer 245 passes. General known techniques used by optimizers can be used to optimize the XDP structures 120 in the IL+XDP intermediate form 270 because the XDP structures 120 are explicit statements and, as such, can be manipulated independent of target machine architecture. After the optimization phase is complete 250, the IL+XDP program 270 is translated to executable code by the compiler's back end 130.

The translation needs to map XDP structures 120 to operations provided by the target computer's hardware and operating system. For instance, on a shared-address computer such as the Kendall Square Research, KSR1, receive and send statements might be translated as prefetch and poststore instructions. On a message-passing machine, they would become calls to the communication primitives. The XDP data and ownership transfer operations allow the compiler to delay until code generation time, the actual binding of communication primitives to the data transfer operations.

Some optimizations, such as compute rule elimination, are independent of the target computer. Other desired optimizations may be machine dependent. These would take place after the machine independent optimizations. For instance, in the resolution of transfer statements, if the communication primitives generated by the compiler are non-blocking, then it is generally desirable to move the XDP receive statements as early in the program as possible (consistent with the data dependence constraints) to give the maximum opportunity of overlapping communication with computation. However, if the communication primitives are blocking, then the optimizations must be careful not to introduce deadlock. By blocking on a device, we mean the suspension of execution. By overlap, we mean the simultaneous execution.

To perform optimizing transformations and code generation, the compiler may need information about the IL+XDP program in addition to the usual data structures such as a control flow graph ant data flow information. For instance, it may be useful for optimizations (and essential for code generation) to annotate an XDP send statement with the id of the receiving processor. Other aspects of XDP code can be handled by traditional techniques. For instance, if no use-def chains from a use of X in an accessible(X) intrinsic lead back to a receive statement, then it may be possible to eliminate the accessible(X) call.

Aggregating a set of separate data transfers into a single message can reduce overhead on some systems. It might be desirable to allow this aggregation to be expressed in XDP, for instance by allowing the left-hand side of XDP send and receive statements to be a set of sections, rather than a single section.

The XDP structures 120 allow ownership transfers to occur at the granularity of a single element. However, for efficiency's sake, a compiler may use a coarser granularity of ownership transfer. The example presented here gives an example of this and how the present invention operates, particularly with a symbol table. Whether the symbol table is simple or complex depends on such choices as whether the number of processors is fixed and known at compile-time, and what partitioning of arrays into sections are allowed. These choices also affect what optimizations can be performed. More optimizations can be performed if the compiler has greater information about partitioning. In our example embodiment, we assume a fixed, known processor grid and partitioning as allowed in High Performance Fortran.

FIG. 4 shows a preferred structure of a compile-time symbol table 400 used by the IL and later developed into the run-time symbol table by the back end 130 using XDP information provided by the optimizer 125. The table 400 includes fields 410 that are typically found in any prior art compile-time table. However, this table 400 has added fields 420 that are used to store XDP information. These XDP fields 420 include a number of segments field 421 and a segment descriptor field 430. The segment descriptor field 430 is an array of entries, one entry for each segment. Each entry is further broken down as follows: status 432, an integer specifying whether the segment associated with the entry is accessible, transitional or unowned; lbound[rank] 434, an array of "rank" items, each specifying the lower bound index of a dimension; ubound[rank] 436, an array of "rank" items, each specifying the upper bound index of a dimension; stride[rank] 438, an array of "rank" items, each specifying the stride along a dimension; and other segptr 439, a pointer to storage for the data stored in the segment, and other 440, a pointer to any other information relevant for the target machine specific optimizations.

The XDP symbol table structure 400 is used at compile-time by the compiler, as well as at run-time by all the processors and/or devices that execute the target code. Each device is provided a local copy of this symbol table 400 at run-time and must maintain and update its own local copy of the XDP symbol table structure at run-time, unless all uses of the table have been optimized away. In contrast to a regular, compiler-time symbol table 400, the run-time XDP symbol table only contains information about exclusive sections. (An exclusive section is either a scalar variable or some subset of a data array's elements that has every element of the section owned exclusively by a given device.) FIG. 4 illustrates the XDP symbol table structure for two array variables A[1:4,1:8] and B[1:16,1:16], partitioned over 4 processors, which are assumed to be indexed as a 2×2 processor grid. The fields 410 symtab index, symbol name, rank, and global shape fields are commonly used. The partitioning field, also commonly used, indicates the partitioning scheme of the array. The partitioning scheme, together with the shape of the processor grid, are used by the compiler and the XDP run-time system to determine ownership of array sections.

For efficiency's sake, the compiler can logically divide each processor's local partition of an array into segments of a size and shape chosen by the compiler. Using XDP, a processor can transfer the ownership of each segment individually.

The partitioning 412, segment shape 414, #segments 421, and segment descriptor 430, fields of the symbol table structure 400 describe the partitioning. In our embodiment, the segment descriptor data structure was declared as shown in FIG. 4. These fields specify how many segments comprise the processor's partition, the shape of each segment (which must have the same rank as the array variable), and finally an array of segment descriptors, which record information for each segment. This segment descriptor information is the status 432, which records the the current state (unowned, transitional, or accessible) of the segment; bound 434, ubound 436 and stride 438, which are used to record which array elements are in the segment, and segptr 439, a pointer to the memory location of the segment. In some cases, for example using certain source (high-level) languages, certain of these fields can be eliminated from the table.

For each segment of a variable, the segment descriptor field lbound 434 gives a lower bound on the array element; the segment descriptor field ubound 436 gives a upper bound on the array element. These two combined allow a segment to be described as a range of contiguous elements. To allow more general specification, we have also included the stride 438 field, which allows this range between the lower bound and upper bound to skip some fixed number of elements equal to the stride value. For example, if the stride is 2, then the segment includes every other element starting from the lower bound and going at most up to the upper bound. These three fields together designate the segment elements.

Either at the start of program execution or dynamically, that is, during run-time execution of the program, each processor allocates local storage for its segments in contiguous chunks whose sizes are determined by the segment shape field. The number of such segments allocated depends on the number of array elements the processor owns. At the start of compile-time, the segment descriptor fields are initialized.

We now describe how the fields specific to XDP in the run-time symbol table are used by each device at run-time. If the code running on a processor executes an iown( ) intrinsic at run-time, the section described in the query is intersected with all the segment bounds corresponding to the named array variable. If the union of all the results is equal to the queried section, and no segment that has a non-null intersection is unowned, then the iown( ) query returns true. Otherwise it returns false. For example, consider an array C[1:4,1:8], distributed as (BLOCK,BLOCK) over a 2×2 processor grid, and 2×1 segmented (as shown in FIG. 9a). Suppose processor P3 executes the operation iown(C[1,5:7]). Intersecting the bounds of the section (1,5:7) with the bounds of the four 1×2 segments owned by P3 yields: (1,5), (1,6), (1,7), null. The union of these is (1,5:7), which is equal to the section specified in the iown( ) query. Now, if none of the non-null intersecting segments are unowned, the operation returns true, and it returns false otherwise. The other intrinsics are handled similarly. Although the algorithm we described for evaluating iown( ) involves examining the entire segment descriptor array, more efficient algorithms could be developed.

When any receive is initiated or completed on a segment, the status field 432 of the segment descriptor 430 needs to be updated as well. When any ownership transfer is initiated, the processor must update the segment descriptor fields of its symbol tables to reflect the data that is currently owned. The partitioning field (see 410) may need to be updated as well.

The use of segments allows the pipelining of a transfer of a section, either the transfer of the ownership of the section or the section data. A processor can transfer each segment individually, requiring only enough synchronization to ensure that the transfer is legal in XDP. In many cases, this can effectively reduce the total time by allowing a processor to overlap one segment's transfer with computation on another segment. This will be illustrated in the 3-D FFT example below.

We have chosen not to supply in the XDP methodology a mechanism for testing which processor owns an arbitrary section at run-time. A compiler using the XDP methodology could itself provide such a mechanism. If such information is unavailable at compile-time and needs to be repeatedly computed at run-time, the techniques such as those of Saltz (Ref Wu, Saltz, Hirandani and Berryman, Runtime compilation methods for multicomputers, proceedings of the 1991 International Conference on Parallel Processing, August, 1991) can be used to improve efficiency. Note, however, that it may be unsafe to compute owner information on an array that is undergoing incremental ownership transfer, until the transfer of all segments has been finished.

To further illustrate the operation of the present invention, a simple example (example 1) of the use of XDP is now presented. Further examples illustrate one of XDP's unique features: the ability to specify dynamic transfer of data ownership.

EXAMPLE 1

Consider the program fragment shown in FIG. 5(a). It can be straightforwardly translated into the IL+XDP SPMD program shown in FIG. 5(b).

This translation follows the "owner-computes" rule. The variable mypid is an intrinsic which evaluates on each processor to a unique integer. Here, we assume that the elements of arrays A, B and T are all exclusively owned and processor mypid owns the mypid-th element of T. The variable i is universally owned, so each processor has its own copy of i.

In the example, each iteration of the loop is executed on every processor. On a given iteration of the loop, the execution of the first statement of the loop, shown in FIG. 5(b), will be executed only by the exclusive owner of B[i]; this is insured by guarding the statement with the intrinsic predicate iown(B[i]). The use of iown is an example of a compute rule, which can be used to guard any XDP statement. Similarly, only the exclusive owner of A[i] will execute the second statement on any iteration of the loop.

Following iown(B[i]) is a data transfer operation statement (see FIG. 3), where the exclusive owner of B[i] sends its value to another, unspecified processor. The notation -> denotes the initiation of a data transfer operation in which the executing processor sends both the name and the value of a section of a variable to an unspecified processor. The statement T[mypid]<-B[i] is a data receive statement, where the executing processor receives the message with name B[i], putting the value into T[mypid]. It is the responsibility of the compiler to only generate programs in which all sends have matching receives. The await( ) intrinsic ensures the sum is not computed until the received value is available.

Optimization can be applied by the compiler to this straightforward translation, based on its knowledge of ownership. For instance, if the same processor that exclusively owns A[i] also owns B[i], then the data transfer statements can be eliminated. Even if they cannot be eliminated, the compiler may be able to move them out of the computation loop and combine or vectorize the messages. In either case, if the loop bounds can be adjusted so that each reference to A[i] is local, then the ownership test on the remaining body of the loop can also be eliminated, yielding a much more efficient SPMD program.

An important feature of XDP is that other strategies than "owner-compute" can be expressed. For instance, the compiler might determine that it would save future communication if ownership of each element of the A array were moved to the same processor as the corresponding element of the B array. The following IL+XDP program fragment shows the result of this optimization:

```
do i = 1, n
    iown(A[i]) : {A[i] - = >}
    iown(B[i]) : {A[i] < = -}
    await(A[i]) : {A[i] = A[i] + B[i]}
enddo
```

Here, the -=> and <=- notation indicates that both the ownership and value of A[i] is moved to the processor that owns B[i]. Only the processor that is the new owner of A[i] will perform the addition.

EXAMPLE 2: 3-D FFT

Figure 9:
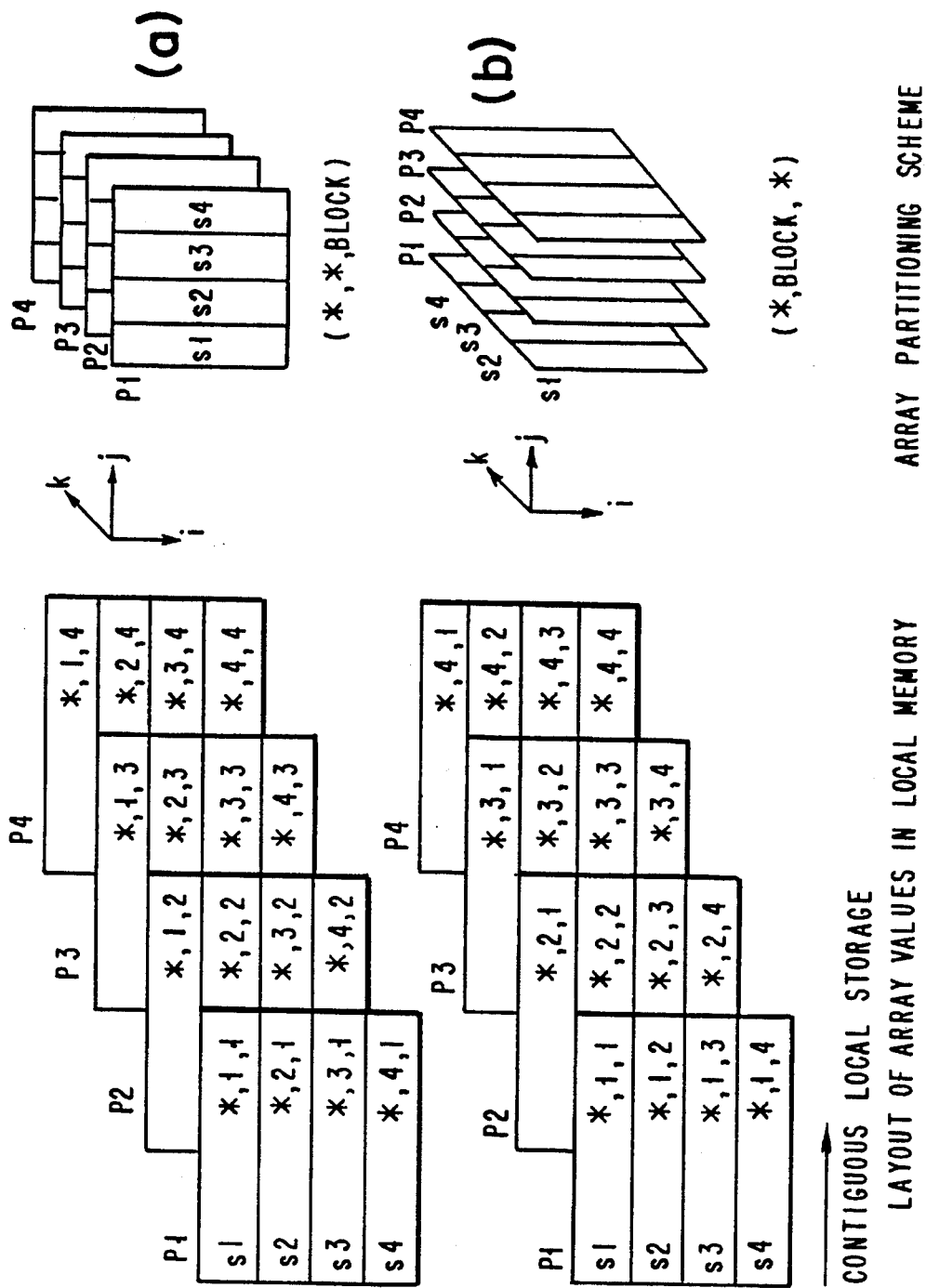
FIG. 9 shows an example of the XDP run-time structures generated for the 3D-FFT program.

We now illustrate a use of XDP, using a 3-dimensional Fast Fourier Transform (3-D FFT) application as an example. The 3-D FFT code considered here operates on an array A[1:4,1:4,1:4] which is assumed to be initially distributed as (*,*,BLOCK) over a linear array of 4 processors P1–P4. Thus, processor i owns the section A[1:4,1:4,i]. Assume that the compiler has chosen to divide each processor's local storage into segments containing 4 consecutive array elements each. The 3-D algorithm employs a 1-D FFT routine, fft1D( ), that is successively applied along each line of the second dimension of the array, then the first and finally the third dimensions to compute the 3-D FFT. The initial (*,*,BLOCK) distribution of the array allows the first two dimensions to be handled with no interprocessor communication. The array is then redistributed to a (*,BLOCK,*) scheme in order that the 1-D FFT along the third dimension can be done independently on each processor without communication. The two partitioning schemes, and the actual data layout in each processor's local storage is shown in FIG. 9.

The following programs illustrate the steps involved in the optimization of the redistribution operation. In order to keep the illustration compact, we start with the IL+XDP code after some compiler optimizations have been finished. These initial optimizations include the insertion of iown( ) guards based on the data distribution of the array A, and generating the appropriate XDP ownership transfer operations to do the redistribute operation to change the partitioning scheme of A from (*,*,BLOCK) to (*,BLOCK,*).

Loop 3 in FIG. 6 is one possible way of performing the desired array redistribution using the XDP ownership transfer operations. Although not shown here, an auxiliary data structure is created by the compiler that links the -=> and <=- statements. This is an extension to a def-use chain, as customarily used in compilers. This is used for communication resolution of the transfer operation at code generation time (at the back end or during the later passes of the optimizer) and to generate matching message types for these communications.

A typical optimization step is compute rule elimination. This is achieved by adjusting the outer loop bounds so that each processor only does those iterations for which it owns the data. To do this, the optimizer can use the information on partitioning 412 in the compile-time symbol table to adjust the loop bounds. The intrinsics mylb and myub will usually appear in the adjusted loop bounds. In our example, all references to the loop's iteration variable in the body of the loop are replaced by only reference to the mypid element. The result is each processor has to execute only one outer loop iteration for each of the loops shown. These single iteration outer loops can also be removed as a further optimization. The resulting code is shown in FIG. 7.

Dependence analysis of Loops 2 and 3a indicates that they can be fused together. See FIG. 8. Loop fusion is a standard optimization which involves taking two loops and forming a single loop whose body contains the contents of both original loops. Thus, loop fusion changes the XDP+IL program, but requires no other changes. Note that the analysis for validity of fusion must also check to make sure that between any -=> and its corresponding <=- operation, no ownership queries are performed on the associated data, and that these data are not accessed by computation in the interim. The potential benefit of the loop fusion is that it allows the ownership transfer to be "pipelined" so that the redistribute latency can be partially covered by the computation.

A second transformation is also illustrated: moving the await statement into Loop 4. Although this might incur a greater run-time overhead, it can allow the FFT operations to proceed while other data is still being transferred. The resulting program is shown in FIG. 8. Again, this is a change solely to the XDP+IL program, and does not require symbol table information changes.

The actual performance improvements of these optimizations depend largely on the capabilities of the run-time communication library of the target machine.

We claim:

1. A method of compiling and executing a computer program on a general purpose target computer system, comprising the steps of:

translating a high level source language into an intermediate language, the intermediate language stored in a computer memory;

inserting one or more transfer statements into the intermediate language during one or more initial passes of an optimizer through the intermediate language, the transfer statements identifying a transfer of information, each of the transfer statements having a transfer operation and a transfer resolution, the transfer operation being a target machine independent part of the transfer of information and the transfer resolution being a target machine dependent part of the transfer of information;

inserting compute rules into the intermediate language in one or more passes of the optimizer through a plurality of statements of the intermediate language, each of the compute rules determining which of one or more of the statements to execute during the executing of the computer program, the intermediate language with the inserted transfer statements and compute rules being an intermediate language plus XDP form;

optimizing the intermediate language plus XDP form, including the transfer operations and compute rules by using the optimizer of the compiler;

translating the optimized intermediate language plus XDP form into a target code in a back end of the compiler, the back end using one or more operations of the target computer system to resolve the transfer resolutions so that the target computer system can perform each transfer of information identified by the respective transfer statement, the transfer statement including the optimization of the transfer operation;

updating a run-time table on each of one or more devices with run-time table information resulting from the execution of one or more target code representations of the transfer operations; and executing the target code on one or more devices of the computer system, the executing referencing one or more target code representations of the compute rules and one or more entries in a run-time table to control the execution of the target code.

2. A method of compiling, as in claim 1, where one or more of the transfer resolutions are resolved in one or more later passes of the optimizer through the intermediate language plus XDP form.

3. A method of compiling, as in claim 1, where the information transferred is data being moved from one device to another.

4. A method of compiling, as in claim 1, where the information transferred is ownership of data from one device to another.

5. A method of compiling, as in claim 1, where one or more of the transfer operations are ownership send statements and ownership receive statements, where the ownership send statement relinquishes ownership of a section of data and the ownership receive statement accepts the ownership of the section of data.

6. A method of compiling, as in claim 1, where one or more of the transfer operations are data send statements and data receive statements, where the data send statement relinquishes the data and the data receive statement accepts the data.

7. A method of compiling and executing a program, as in claim 1, where one or more of the compute rules comprise one or more intrinsic functions obtained from a library of one or more intrinsic functions.

8. A method of compiling and executing a program, as in claim 1, where the compute rules comprise one or more boolean expressions.

9. A general purpose target computer system, comprising:

an intermediate language having a plurality of statements, the intermediate language translated from a computer program in a high level source language;

a compiler means further comprising:

means for inserting one or more transfer statements into the intermediate language during one or more initial passes of an optimizer through the intermediate language, the transfer statements identifying a transfer of information, each of the transfer statements having a transfer operation and a transfer resolution, the transfer operation being a target machine independent part of the transfer of information and the transfer resolution being a target machine dependent part of the transfer of information;

means for inserting compute rules into the intermediate language in one or more passes of the optimizer through a plurality of statements of the intermediate language, each of the compute rules determining which of one or more of the statements to execute at an execution time, the intermediate language with the inserted transfer statements and compute rules being an intermediate language plus XDP form;

means for optimizing the intermediate language plus XDP form, including the transfer operations and compute rules by using the optimizer of the compiler; and means for translating the optimized intermediate language plus XDP form into a target code in a back end of the compiler, the back end using one or more operations of the target computer system to resolve the transfer resolutions so that the target computer system can perform each transfer of information identified by the respective transfer statement, the transfer statement including the optimization of the transfer operation; and one or more devices each having a run-time table with run-time table information resulting from the execution of one or more target code representations of the transfer operations, the execution of the target code the devices during the execution time controlled by the run-time table information in the respective run-time table for the device and the compute rules.

10. A computer system, as in claim 9, where the part of the target code representing compute rules and the execution referencing run-time table information is used to balance a load of execution on each device.

* * * * *